(12) United States Patent
Pan et al.

(10) Patent No.: US 12,487,844 B2
(45) Date of Patent: Dec. 2, 2025

(54) IMAGE MANAGEMENT FOR CONTAINER RUNTIMES

(71) Applicant: INTERNATIONAL BUSINESS MACHINES CORPORATION, Armonk, NY (US)

(72) Inventors: Xun Pan, Xian (CN); Ge Wei Pang, Xian (CN); Jing Chen, Xian (CN)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 17/706,721

(22) Filed: Mar. 29, 2022

(65) Prior Publication Data
US 2023/0315502 A1    Oct. 5, 2023

(51) Int. Cl.
*G06F 9/46* (2006.01)
*G06F 8/61* (2018.01)
(Continued)

(52) U.S. Cl.
CPC ............ *G06F 9/45558* (2013.01); *G06F 8/63* (2013.01); *G06F 16/188* (2019.01); *G06F 21/31* (2013.01);
(Continued)

(58) Field of Classification Search
CPC .... G06F 9/45558; G06F 16/188; G06F 16/63; G06F 21/31; G06F 21/64; G06F 2009/4557; G06F 2221/2141
See application file for complete search history.

(56) References Cited

U.S. PATENT DOCUMENTS

| | | |
|---|---|---|
| 2014/0095459 A1 | 4/2014 | Eshel |
| 2017/0177860 A1 | 6/2017 | Suarez |

(Continued)

FOREIGN PATENT DOCUMENTS

| | | |
|---|---|---|
| CN | 104603762 A | 5/2015 |
| CN | 110622129 A | 12/2019 |

(Continued)

OTHER PUBLICATIONS

Liu et al., "Containerd Brings More Container Runtime Options for Kubernetes", Kubernetes Blog, Nov. 2, 2017. 5 pages, <https://kubernetes.io/blog/2017/11/containerd-container-runtime-options-kubernetes/>.

(Continued)

*Primary Examiner* — Diem K Cao
(74) *Attorney, Agent, or Firm* — Joseph P. Curcuru

(57) ABSTRACT

Disclosed is an approach for image management for container runtimes. A first image of a first application for a first container runtime can be downloaded from an image repository providing the first image. Content data of the first application and management data corresponding to the first application and the first container runtime can be extracted from the first image. Both the content data of the first application and the management data corresponding to the first application and the first container runtime can be stored in an image sharing file system in response to the content data of the first application being not stored in the image sharing file system. Only the management data corresponding to the first application and the first container runtime can be stored in the image sharing file system in response to the content data of the first application being stored in the image sharing file system.

20 Claims, 8 Drawing Sheets

(51) Int. Cl.
  *G06F 9/455* (2018.01)
  *G06F 16/188* (2019.01)
  *G06F 21/31* (2013.01)
  *G06F 21/64* (2013.01)
(52) U.S. Cl.
  CPC ...... *G06F 21/64* (2013.01); *G06F 2009/4557* (2013.01); *G06F 2221/2141* (2013.01)

(56) References Cited

U.S. PATENT DOCUMENTS

| | | | |
|---|---|---|---|
| 2017/0180346 A1* | 6/2017 | Suarez | G06F 9/45558 |
| 2018/0032410 A1 | 2/2018 | Kang | |
| 2018/0173502 A1 | 6/2018 | Biskup | |
| 2020/0356806 A1 | 11/2020 | Li | |
| 2021/0075855 A1 | 3/2021 | Spillane | |
| 2022/0357974 A1* | 11/2022 | Gomez | G06F 9/45558 |

FOREIGN PATENT DOCUMENTS

| | | | | |
|---|---|---|---|---|
| CN | 112394907 A | 2/2021 | | |
| WO | WO-2021197579 A1 * | 10/2021 | ............... | G06F 8/60 |

OTHER PUBLICATIONS

Jonas, K, "Cri-O: An Open Source Container Runtime for Kubernetes", InfoQ, May 17, 2019, 3 pages, <https://www.infoq.com/news/2019/05/cri-o-kubernetes-runtime/>.

Mell et al., "The NIST Definition of Cloud Computing", Recommendations of the National Institute of Standards and Technology, Special Publication 800-145, Sep. 2011, 7 pages.

Spillane et al., "Exo-clones: Better Container Runtime Image Management across the Clouds", 8th USENIX Workshop on Hot Topics in Storage and File Systems, Jun. 20-21, 2016, Denver, CO, USA, 5 pages.

Zheng et al., "Wharf: Sharing Docker Images in a Distributed File System", SoCC'18, Oct. 11-13, 2018, Carlsbad, CA, USA, pp. 174-185.

International Search Report and Written Opinion, International Application No. PCT/CN2023/083383, International Filing Date Mar. 23, 2023.

* cited by examiner

US 12,487,844 B2

IMAGE MANAGEMENT FOR CONTAINER RUNTIMES

BACKGROUND

The present disclosure relates generally to container runtimes, and more specifically, to image management for container runtimes.

Containerization provides lightweight virtualization that allows for isolating processes and/or resources without the need of providing instruction interpretation mechanisms and/or other complexities of full virtualization.

A container image created by containerization technology includes all the files required by the application to run. Application containerization is an operating system-level virtualization method used to deploy and run distributed applications without launching an entire virtual machine for each application. Container images of applications may work on bare-metal systems, cloud instances, and virtual machines, across different types of operating systems.

With the continuous development of virtualization technology, various container runtime technologies, such as Docker®, Singularity® or Linux® Container (LXC), are developed in the field.

SUMMARY

According to one embodiment of the present disclosure, there is provided a computer-implemented method of image management for container runtimes. In this method, a first image of a first application for a first container runtime can be downloaded by one or more processing units from an image repository providing the first image. Content data of the first application and management data corresponding to the first application and the first container runtime can be extracted by one or more processing units from the first image. Both the content data of the first application and the management data corresponding to the first application and the first container runtime can be stored by one or more processing units in an image sharing file system in response to the content data of the first application being not stored in the image sharing file system. Only the management data corresponding to the first application and the first container runtime can be stored by one or more processing units in the image sharing file system in response to the content data of the first application being stored in the image sharing file system.

According to another embodiment of the present disclosure, there is provided a system of image management for container runtimes. The system comprises one or more processors, a memory coupled to at least one of the processors and a set of computer program instructions stored in the memory. When executed by at least one of the processors, the set of computer program instructions perform following actions. A first image of a first application for a first container runtime can be downloaded from an image repository providing the first image. Content data of the first application and management data corresponding to the first application and the first container runtime can be extracted from the first image. Both the content data of the first application and the management data corresponding to the first application and the first container runtime can be stored in an image sharing file system in response to the content data of the first application being not stored in the image sharing file system. Only the management data corresponding to the first application and the first container runtime can be stored in the image sharing file system in response to the content data of the first application being stored in the image sharing file system.

According to a yet another embodiment of the present disclosure, there is provided a computer program product of image management for container runtimes. The computer program product comprises a non-transitory computer readable storage medium having program instructions embodied therewith. The program instructions are executable by a processor to cause the processor to perform following actions. A first image of a first application for a first container runtime can be downloaded from an image repository providing the first image. Content data of the first application and management data corresponding to the first application and the first container runtime can be extracted from the first image. Both the content data of the first application and the management data corresponding to the first application and the first container runtime can be stored in an image sharing file system in response to the content data of the first application being not stored in the image sharing file system. Only the management data corresponding to the first application and the first container runtime can be stored in the image sharing file system in response to the content data of the first application being stored in the image sharing file system.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
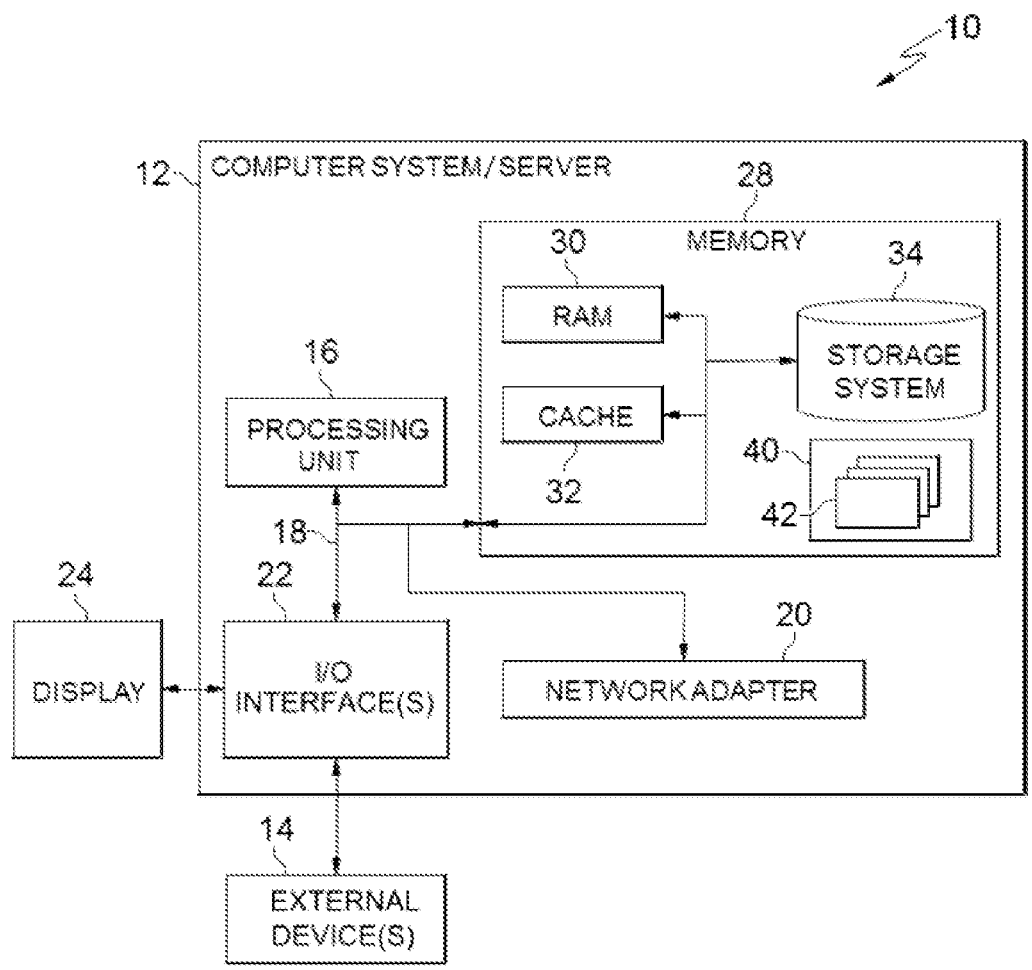
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
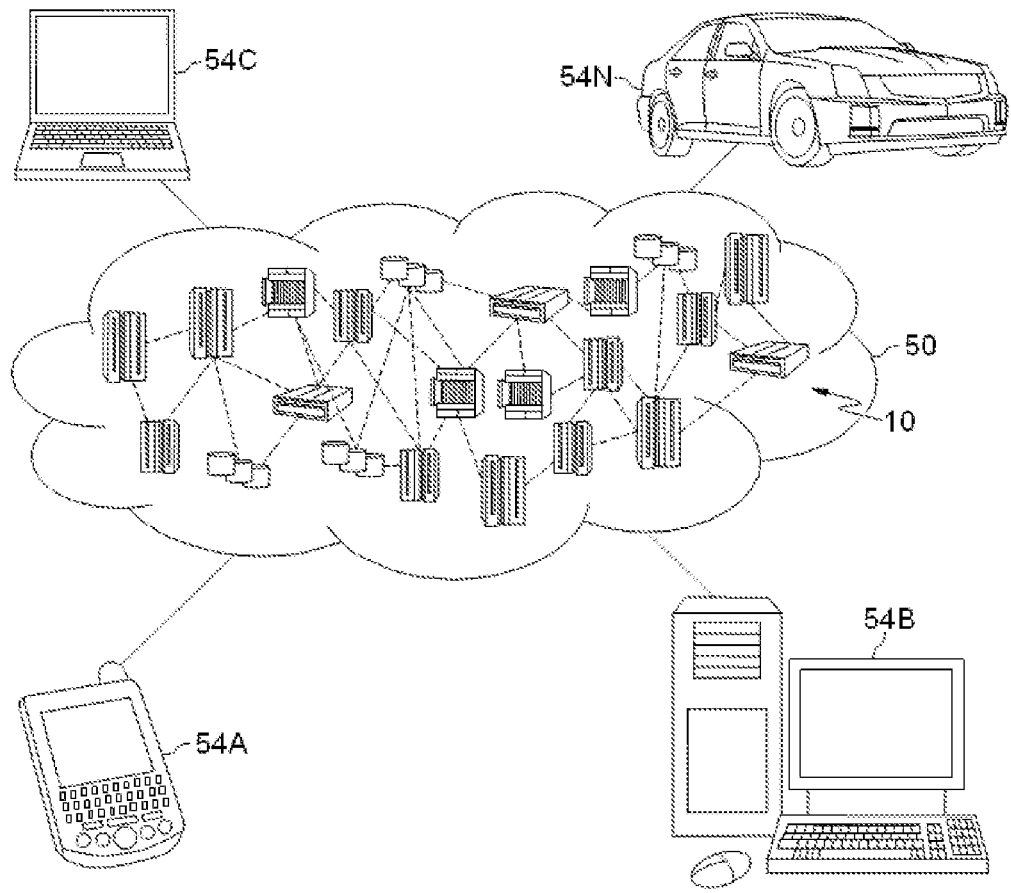
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
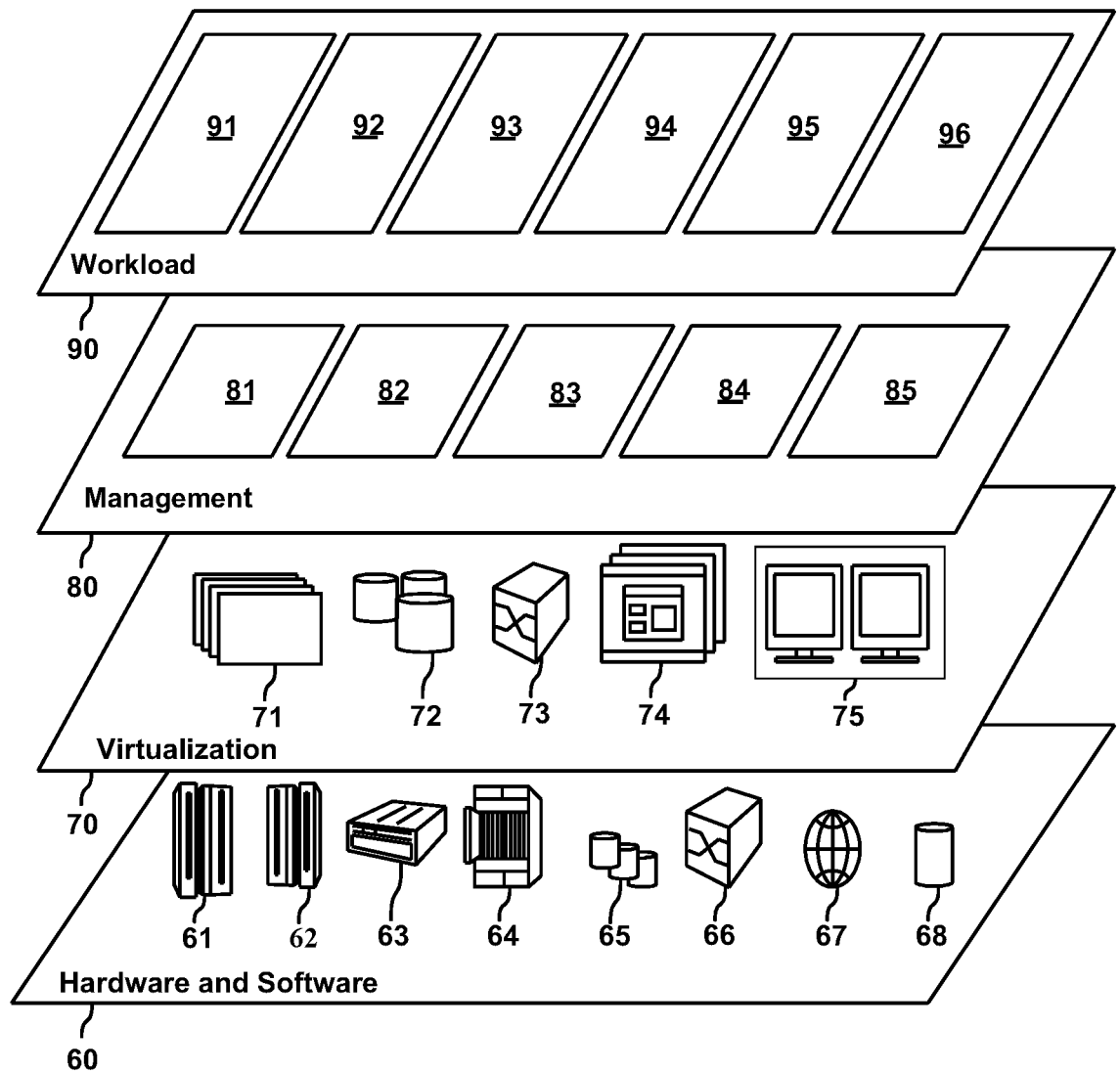
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and image management 96.

As mentioned in the above, there are various container runtime technologies, such as Docker®, Singularity® or Linux® Container (LXC), in the field. Different container runtimes may be used in a host because different container runtime technologies may be suitable for different application scenarios. For example, in High Performance Computing (HPC), Singularity® may be the mostly used container runtime technology, and in Cloud Native, Docker® is commonly used to manage services and AI workloads. Further, due to vendor lock or technology evolvement, one container runtime may not be suitable in a long-term use case, and thus multiple container runtimes should be used in such a case.

In addition, in a case that multiple container runtimes are used for a same application in a host, the host may need to download multiple images of the same application for the multiple container runtimes respectively, and/or store the multiple images of the same application. Such an operation costs much storage and/or bandwidth of the host.

Embodiments of the present disclosure can solve at least one of the technical problems described above, and propose a method, system and computer program product for image management for container runtimes. In the image management for container runtimes according to embodiments of the present disclosure, content data of an image for a same application can be shared across multiple container runtimes, and the content data of the same application can be stored only once in a file sharing system to be reused for multiple container runtimes. According to embodiments of the present disclosure, there is no need to store the duplicated content data of the same application for multiple different container runtimes. Therefore, storage space can be saved. On the other hand, when an image of an application for a container runtime is requested by a user, the image can be created based on the content data of the application stored in an image sharing file system. In such a case, a host can obtain an image of an application for a desired container runtime based on the stored content data of the same application without pulling a full image from a repository even if the stored content data of the application is extracted from a different container runtime, enabling highly efficient image management for hybrid container runtimes and reduction in storage space and network bandwidth consuming.

Figure 4:
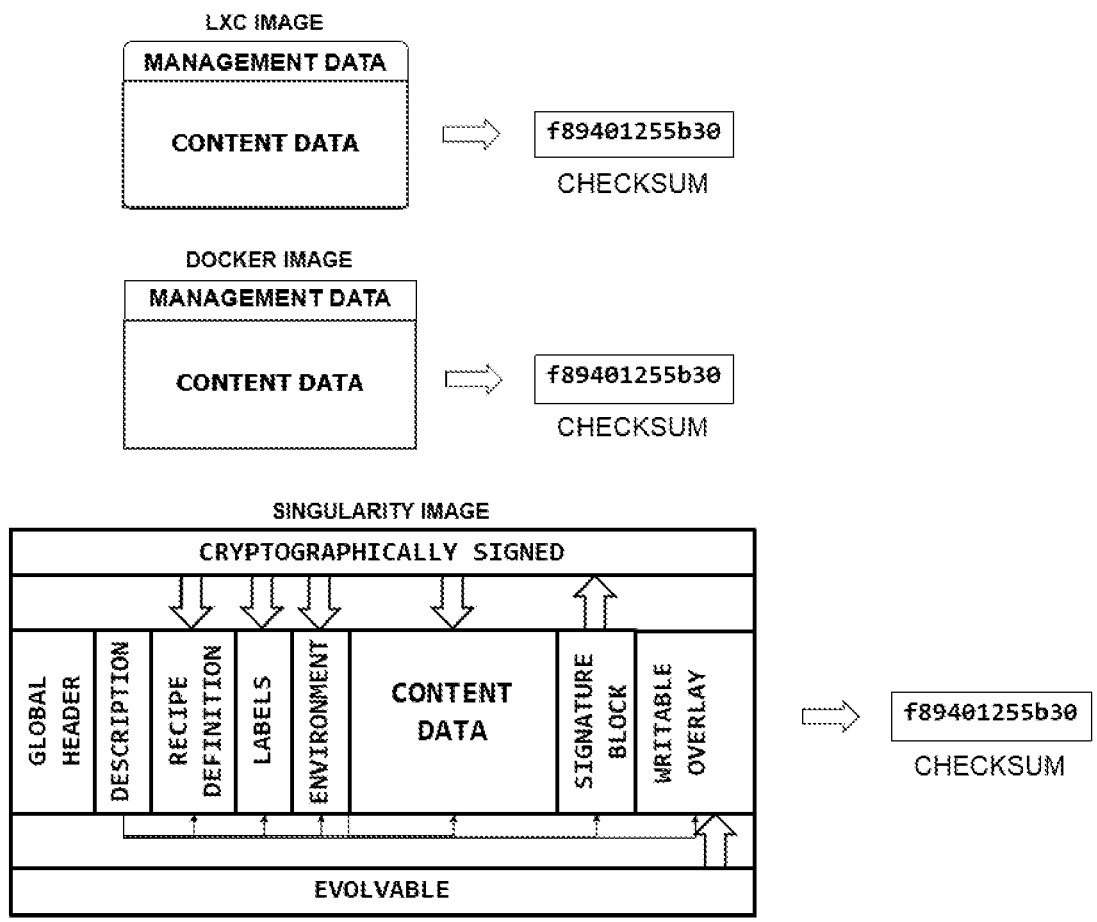
FIG. 4 depicts a basic structure of images for different container runtimes according to an embodiment of the present disclosure.

FIG. 4 shows three exemplary container images of a same application for three different container runtimes, which are LXC image, Docker image, and Singularity image.

As shown in FIG. 4, those images for the three different container runtimes all include content data and management data. The management data is metadata of the image, which describes attributes of the image. Different container runtimes may have different management data. For example, the management data may include the image name, the image version, and other information about size, digest, operating system, architecture, runtime requirements, etc. of a container image. As an example, management data may be described by a JSON (JavaScript Object Notation) file. The content data is the data for providing functions of the application provided by the image. Different applications can have different content data, and the same application can have the same content data even for different container runtimes. The content data can include deployed binaries (e.g., the application content) and their dependencies for running the image (e.g., libraries, environment variables, configuration files).

The management data of these three container images may have different formats corresponding to the respective container runtimes. For example, the management data for the LXC image is a "tar.xz" file, and the management data for the Singularity image consists of several parts such as Global headers, Descriptors, and Signature Block. The content data of those images are the same because the three container images are for the same application. Therefore, the content data of these images for the same application can be shared.

Figure 5:
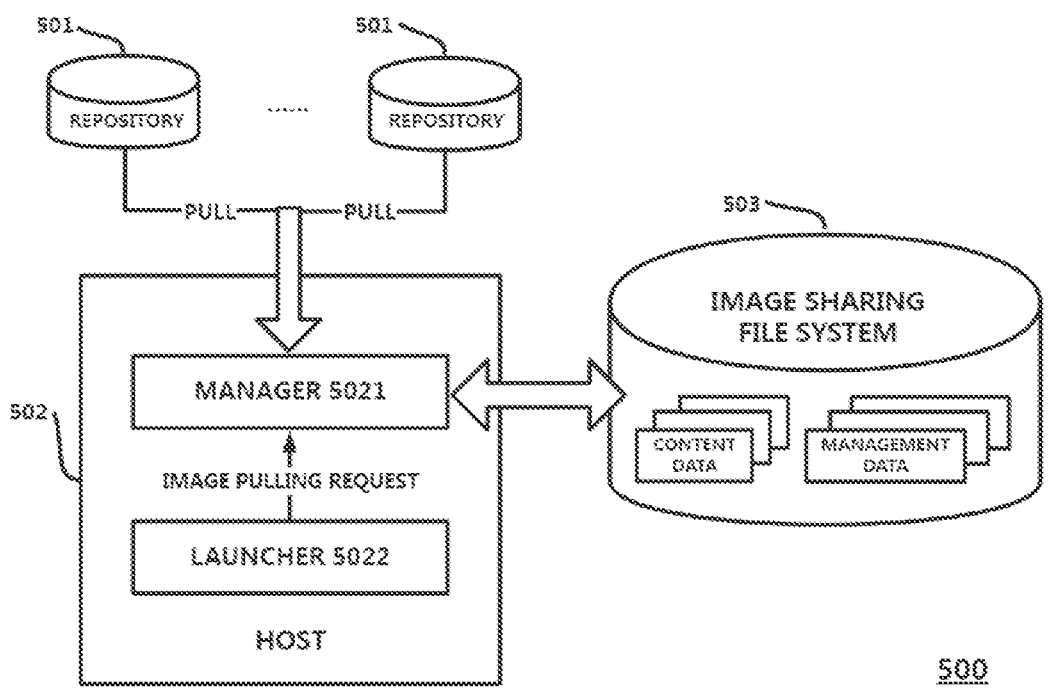
FIG. 5 depicts a basic architecture for image management according to an embodiment of the present disclosure.

FIG. 5 is a basic architecture for image management according to an embodiment of the present disclosure.

Architecture 500 comprises at least one repository 501, a host 502 and an image sharing file system 503. Host 502 can comprise an image manager 5021 and a container launcher 5022.

Repository 501 can be a container image registry or hub for storing and providing container images. Repository 501 can be a public registry, a private registry, or any other registry known in the art. Repository 501 can be connected to host 502, so that host 502 is able to pull container images from repository 501 or push container images to repository 501. Additionally, architecture 500 can include other hosts connecting with the at least one repository 501.

Host 502 can be any machine that can run containers, either a physical machine or a virtual machine. Container launcher 5022 in host 502 can send an image pulling request for an application to image manager 5021 to request a container image for running, and a running instance of an image can be formed into a container of the application. Upon receiving the request, the image manager 5021 can return the requested image to container launcher 5022 with the help of repository 501 and/or image sharing file system 503 according to embodiments of the present disclosure. The image manager 5021 can work as an interface between container launcher 5022 and repository 501/image sharing file system 503. For example, depending on different situations, the image manager 5021 can download or pull images from repository 501, store management data and content data of images to image sharing file system 503, and create images based on content data stored in image sharing file system 503. Detailed operations of the image manager 5021 will be described later with reference to FIG. 6 and FIG. 7.

Image sharing file system 503 can store management data and content data of images downloaded from repository 501. The stored content data can be shared across different container runtimes. Image sharing file system 503 can be a storage device within host 502, or a storage device separate from host 502, or a distributed storage device among multiple hosts. In addition, image sharing file system 503 can be implemented by one physical device or can be implemented by multiple interconnected physical devices.

Architecture 500, shown in FIG. 5, is an example of architectures to implement embodiments of the present disclosure. The present disclosure is not limited to the shown structure. For example, the architecture 500 may include more than one host connected with each other to form a distributed management system. Those hosts can have an image manager and share one or more image-sharing file systems. Those image-sharing file systems can also be connected to form a distributed storage system.

According to embodiments of present disclosure, image manager 5021 can extract content data and management data from an image downloaded from repository 501 and store the management data and the content data separately into image sharing file system 503. Image manager 5021 can also create an image of a container runtime for an application based on the content data for the application stored in image sharing file system 503 and the management data for the container runtime. The management data for the container runtime can be for example generated based on the management data for another container runtime.

Figure 6:
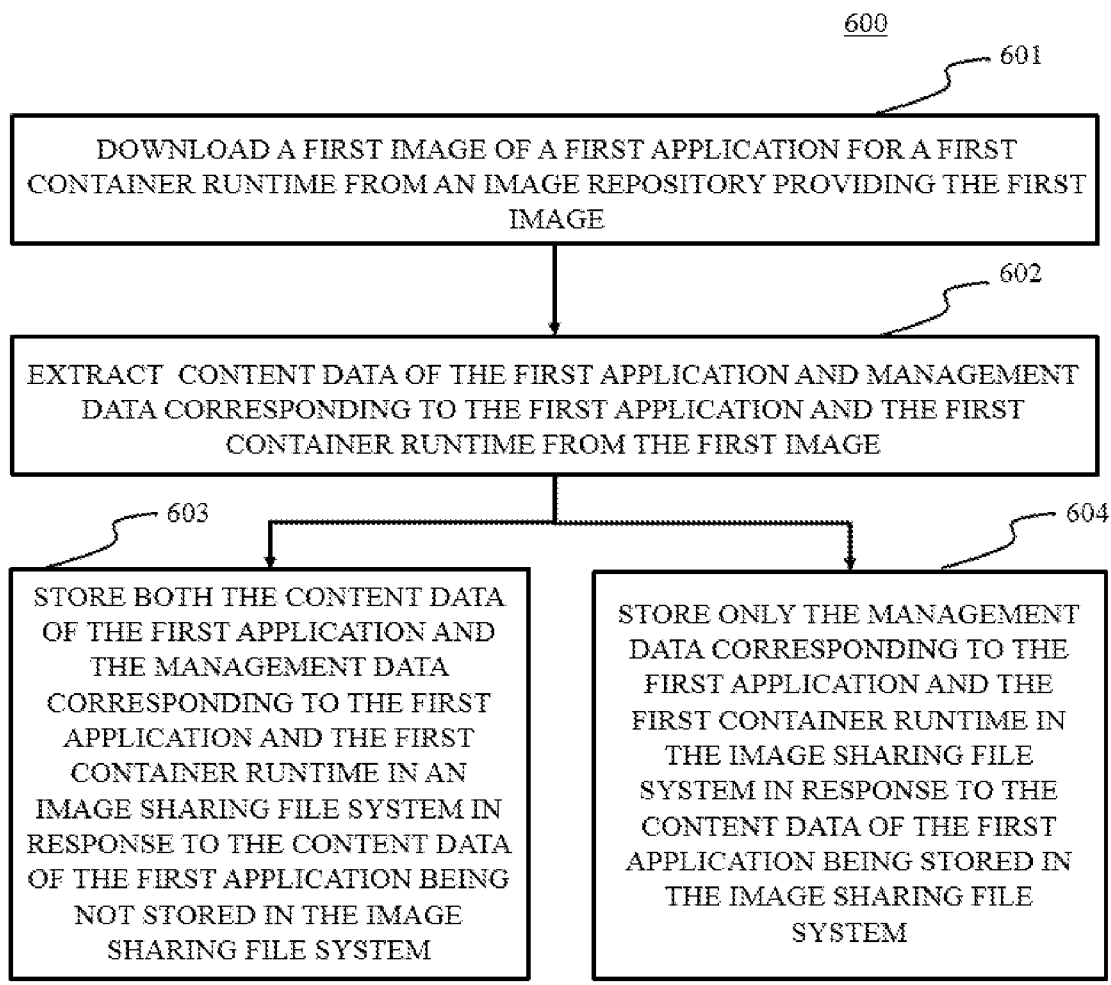
FIG. 6 depicts a flowchart of a method according to an embodiment of the present disclosure.

FIG. 6 shows a flowchart of a computer-implemented method 600 of image management for container runtimes according to an embodiment of the present disclosure. The method 600 may be executed in any of the environments described in FIGS. 1-5 according to the present disclosure. For example, method 600 can be executed by host 502, particularly with image manager 5021.

Each step of method 600 can be performed by one or more processing units, such as central processing unit (CPU) in host 502.

With reference to FIG. 6, method 600 comprises steps 601-604. At step 601, a first image of a first application for a first container runtime can be downloaded from an image repository providing the first image. There can be various ways to trigger the downloading. For example, the downloading can be performed by image manager 5021 in response to receiving an image pulling request from container launcher 5022. Alternatively, the image manger 5021 can download some commonly used container images when initialization or regularly. The image to be downloaded can be an image of any application for any container runtime, for example, a Docker image for "Openfoam" application. The image repository can be any image repository such as a repository described with reference to FIG. 5.

At step 602, content data of the first application and management data corresponding to the first application and the first container runtime can be extracted from the first image.

As described in the above, each container image can include content data of an application and management data corresponding to the application and a specific container runtime. The two types of data have different characteristics and can be extracted from the image. The content data of images for the same application are the same even for different container runtimes while different container runtimes may have different management data even for the same application. Accordingly, the two types of data can be extracted to be differently processed, in particular, the extracted content data can be shared across different container runtimes. For example, an image of "Openfoam" application for different container runtimes includes a same set of files for CentOS and the same application content, and thus the same set of files and the same application content can be shared across different container runtimes.

Next, depending on whether the content data of the first application has been stored in the image sharing file system, step 603 or 604 will be performed.

At step 603, both the content data of the first application and the management data corresponding to the first application and the first container runtime can be stored in an image sharing file system in response to the content data of the first application being not stored in the image sharing file system. At step 604, only the management data corresponding to the first application and the first container runtime can be stored in the image sharing file system in response to the content data of the first application being stored in the image sharing file system.

As described in the above, the content data of images is the same for the same application. Therefore, if the content data of the first application has been stored in the image sharing file system, the content data of the first application will not be stored repeatedly even if the stored content data was extracted from an image of a container runtime different from the first container runtime. In such a case, the extracted management data of the image will be stored in the image sharing file system. On the other hand, if the content data of the first application image does not exist in the image sharing file system, for example, the image of the first application is downloaded from the image repository for the first time, then both the content data and the management data of the image are stored in the image sharing file system.

According to the above embodiments of the present disclosure, the content data of the same application can be only stored in the image sharing file system once for various container runtimes, and accordingly, a large amount of storage space can be saved because the content data of an image is much larger than the management data of the image. With such an image sharing file system, when an image of an application is requested, the stored content data of the application can be retrieved from the image sharing file system and used to create the image together with management data of the image. Accordingly, there is no need to download the image from a remote repository, and communication bandwidth can be saved.

In some embodiments, the content data and the management data of the image can be stored in the image sharing file system in a copy-on-write (CoW) manner, such that the data subjected to copy-on-write operation can be read and written concurrently without locking the original data, thus realizing efficient read and write operations.

Figure 7:
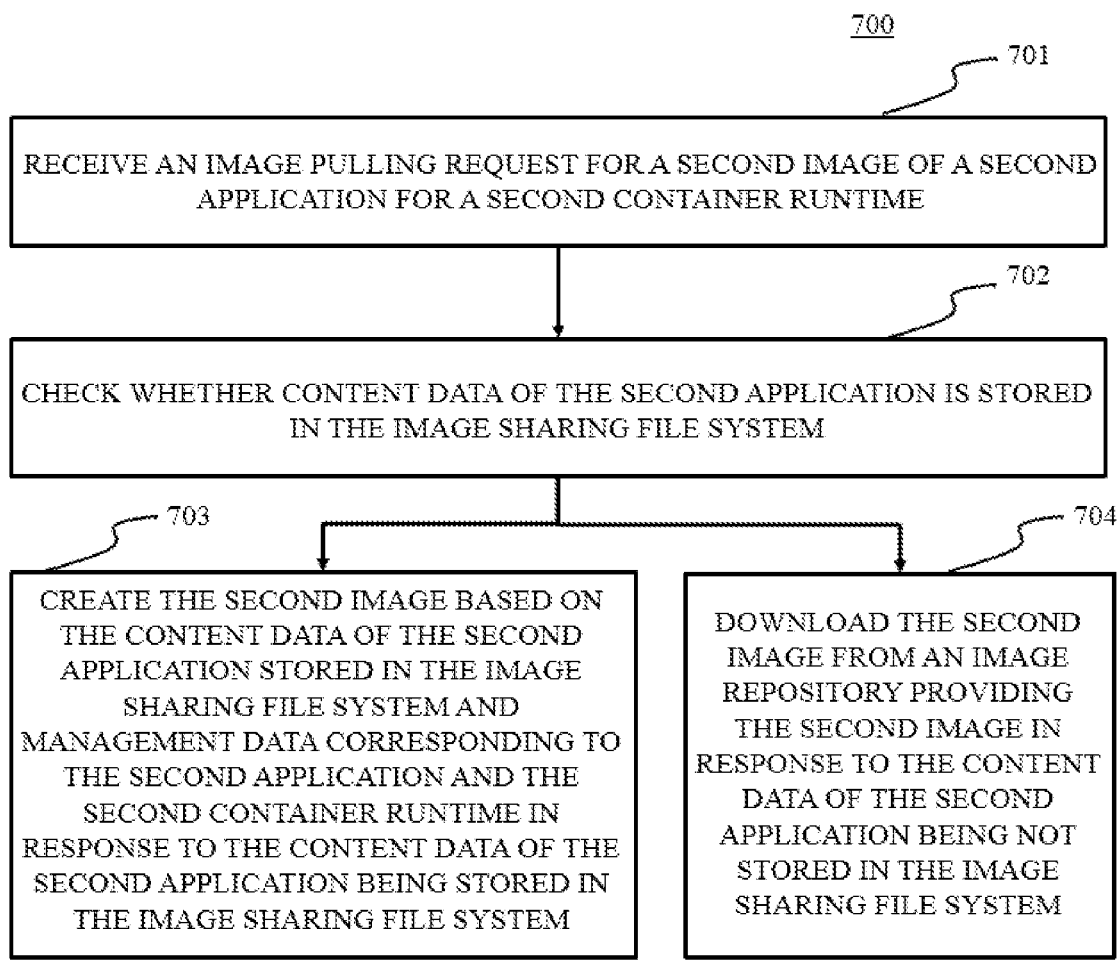
FIG. 7 depicts a flowchart of a method according to another embodiment of the present disclosure.

FIG. 7 shows a flowchart of a method 700 of image management according to another embodiment of the present disclosure. FIG. 7 presents how to obtain an image of an application after the image is requested. The method 700 can be executed in any of the environments described in FIGS. 1-5 according to the present disclosure. For example, method 700 can be executed by host 502, particularly with image manager 5021. Steps of method 700 can be performed by one or more processing units, such as central processing unit (CPU) in host 502.

With reference to FIG. 7, the method 700 comprises steps 701-704. At step 701, an image pulling request for a second image of a second application for a second container runtime can be received. The image pulling request can be sent by a host which is to launch a container corresponding to the image to request the image. For example, the image pulling request can be sent by container launcher 5022 and be received by image manager 5021.

At step 702, whether content data of the second application is stored in the image sharing file system can be checked. As described with respect to FIG. 6, the image sharing file system can store content data of applications. Therefore, whether the content data of the requested second application is already stored in the image sharing file system can be checked, and then different operations can be performed according to different checking results.

There can be various ways to implement the checking in step 702. In one embodiment, the checking can be performed based on image names of the images stored in the image sharing file system. Images or their content data stored in the image sharing file system can be named according to a specified rule. Therefore, when an image is requested, the information of the request application in the request can be used as keywords to search the image names of the images stored in the image sharing file system. If any image name matches the keywords, the corresponding content data can be found, and if no image name matches the keywords, it can be determined that content data of the requested application is not stored. For example, the image name can be given in a format of "version.name.user.repo.kind." The fields in the example format of the image name can respectively indicate the version, application name, user name, source (repository), and category of the named image.

In one embodiment, in response to the image pulling request, the processing unit of the host can obtain the application name of the requested image from the image pulling request and search the names of the images stored in the image sharing file system based on the application name. If the "name" field of any image name stored in the image sharing file system matches or contains the application name in the image pulling request, then the content data corresponding to the image name can be considered as the target content data of the requested application.

Alternatively, in another embodiment, the checking can be performed based on checksum of the content data. In particular, in response to receiving the image pulling request for the second image, the processing unit of the host can download, from the image repository providing the second image, the management data of the second image corresponding to the second container runtime, obtain the checksum of the content data from the management data, and check whether there is content data of the second application stored in the image sharing file system based on the checksum. The host can search the management data stored in the image sharing file system with the obtained checksum. If the same checksum is found in any stored management data, then the corresponding content data can be found to be the target content data. If no same checksum is found in stored management data, then it can be determined that content data of the requested application is not stored.

For example, as shown in FIG. 4, a checksum can be calculated for the content data of each image, and the corresponding checksum value can be written as an attribute of the image into the management data of the image. Therefore, the checksum for the content data of a specific application can be obtained from the downloaded management data. In the example of FIG. 4, the three images are for the same application, and thus the calculated checksums ("f89401255b30" as shown in FIG. 4) for the content data of the three images are the same. Based on the checksum of the content data, it is possible to check whether there is content data of the second application stored in the image sharing file system by comparing the checksum values of the content data of the images.

It should be noted that the mechanism for checking whether the content data of the second application is stored in the image sharing file system can also be applied to check whether the content data of the first application is stored in the image sharing file system if needed for FIG. 6. Checking whether the content data of the first application is stored in the image sharing file system for FIG. 6 can be performed before or after downloading the first image.

Returning to FIG. 7, depending on whether the content data of the second application has been stored in the image sharing file system, step 703 or 704 will be performed.

At step 703, the second image can be created based on the content data of the second application stored in the image sharing file system and management data corresponding to the second application and the second container runtime in response to the content data of the second application being stored in the image sharing file system.

According to embodiments of the present disclosure, if the content data of the requested application (the second application) has been stored in the image sharing file system, the host would not download the requested image (the second image) from a remote repository but create the second image based on the content data of the second application stored in the image sharing file system. To create the second image, management data corresponding to the second application and the second container needs to be obtained in addition to the content data.

In one embodiment, the management data corresponding to the second application and the second container runtime can be retrieved from the image sharing file system. For example, the second image of the second application for the second container runtime was downloaded from the image repository previously, and both the content data and the management data of the second image were stored into the image sharing file system, as described at step 603, after downloading the second image. Accordingly, when the second image of the second application for the second container runtime is requested again, both the content data of the second application and the management data stored in the image sharing file system can be reused to create the second image.

In another embodiment, the management data of the second image for the second container runtime may not exist in the image sharing file system. In such a case, the management data corresponding to the second application and the second container runtime can be generated based on management data corresponding to the second application and a third container runtime stored in the image sharing file system, and the third container runtime is different from the second container runtime. The management data of the third container runtime may be different from the management data of the second container runtime but have sufficient information for generating the management data of the second container runtime. For example, a Docker image of an application "Openfoam" was previously downloaded from the image repository, and both the content data and the management data of the Docker image were stored into the image sharing file system after downloading the Docker image. The requested second image is a Singularity image of the same application "Openfoam", and thus the content data of application "Openfoam" was previously stored in the image sharing file system. However, the management data corresponding to the Singularity container runtime is not existed in the image sharing file system. In such a case, the management data of the requested Singularity image can be generated based on information in the stored management data of the Docker image.

In yet another embodiment, the management data corresponding to the second application and the second container runtime can be downloaded from the image repository providing the second image. In this case, the second image can be created based on the content data of the second application stored in the image sharing file system and the management data corresponding to the second application and the second container runtime downloaded from the image repository providing the second image. In this embodiment, it is not necessary to download the whole second image, just the management data, which significantly reduces the communication bandwidth requirement.

In addition, in some embodiments, when creating the second image, a user permission can be added to the second image, wherein the user permission allows a user indicated in the user permission to access the second image. For example, for a rootless container technology such as Podman®, unlike the Docker container, a Podman image does not need to run a Docker daemon process on the host but uses the user namespace to emulate root in the container. Therefore, a Podman image can run without root privileges.

Preventing security risks due to an operation without a permission, the user needs a corresponding permission for accessing the data of the obtained image to run the image for such a rootless container runtime. For example, a Podman image is created for user A based on the content data stored by user B in the image sharing file system, the created Podman image cannot run without a permission for user A, because such an image has different permissions for different users. In this way, the content data of images can be shared among users with different permissions, enabling a permission management for multiple container runtimes.

Accordingly, in some embodiments, upon creating such a rootless image, the host can add a user permission to the rootless image, such that the user of the host is permitted to access the rootless image (e.g., read and/or write the data of the image). The added user permission to the rootless image indicates ownership by the user, which allows the user to access the corresponding image. In this way, the above-described embodiments, according to the present disclosure, can also provide management for rootless container images. It should be noted that the above-described embodiments are not limited to rootless container images, for example, for security purposes of any kind of container images to be protected, a user permission can be added to allow a user indicated in the user permission to access a protected image.

Continuing with the process flow of method 700, if the content data of the second application is stored in the image sharing file system, then step 704 is performed. At step 704, the second image can be downloaded from an image repository providing the second image in response to the content data of the second application being not stored in the image sharing file system. Step 704 can be performed in a similar manner to step 601 described above. Further, in response to the second image the content data of the second application being not stored in the image sharing file system, for example, the second image being downloaded for the first time, both the content data of the second application and the management data corresponding to the second application and the second container runtime can be stored in the image sharing file system, e.g., like step 603.

According to embodiments of the present disclosure, an efficient image management can be provided, in which the content data of an application can be shared across different container runtimes, and thus communication bandwidth and storage space can be saved.

Figure 8:
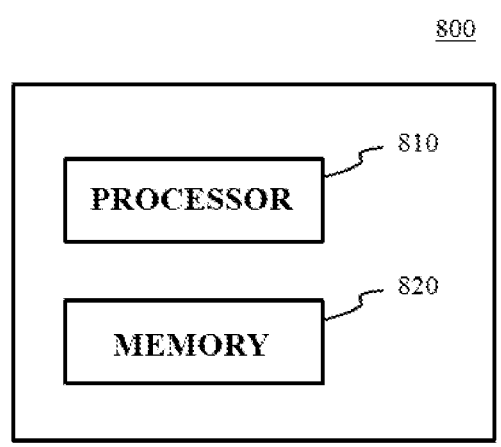
FIG. 8 depicts a system of image management for container runtimes according to an embodiment of the present disclosure.

Referring now to FIG. 8, there is shown a system 800 of image management for container runtimes according to an embodiment of the present disclosure. The system 800 of image management for container runtimes comprises one or more processors 810 and a memory 820 coupled to at least one of the processors 810. A set of computer program instructions are stored in the memory 820. When executed by at least one of the processors 810, the set of computer program instructions perform following series of actions. A first image of a first application for a first container runtime can be downloaded from an image repository providing the first image. Content data of the first application and management data corresponding to the first application and the first container runtime can be extracted from the first image. Both the content data of the first application and the management data corresponding to the first application and the first container runtime can be stored in an image sharing file system in response to the content data of the first application being not stored in the image sharing file system. Only the management data corresponding to the first application and the first container runtime can be stored in the image sharing file system in response to the content data of the first application being stored in the image sharing file system.

In an embodiment, an image pulling request for a second image of a second application for a second container runtime can be received, content data of the second application stored in the image sharing file system can be checked, the second image based on the content data of the second application stored in the image sharing file system and management data corresponding to the second application and the second container runtime can be created in response to the content data of the second application being stored in the image sharing file system, and the second image can be downloaded from an image repository providing the second image in response to the content data of the second application being not stored in the image sharing file system.

In an embodiment, the management data corresponding to the second application and the second container runtime can be retrieved from the image sharing file system. Alternatively, in another embodiment, the management data corresponding to the second application and the second container runtime can be generated based on management data corresponding to the second application and a third container runtime stored in the image sharing file system, wherein the third container runtime is different from the second container runtime.

In an embodiment, content data of the second application stored in the image sharing file system can be checked based on image names of the images stored in the image sharing file system.

In an embodiment, the management data corresponding to the second application and the second container runtime can be downloaded from the image repository providing the second image, a checksum for the content data of the second application can be obtained from the management data corresponding to the second application and the second container runtime, and content data of the second application stored in the image sharing file system can be checked based on the checksum.

In an embodiment, the second image can be created based on the content data of the second application stored in the image sharing file system and the management data corresponding to the second application and the second container runtime downloaded from the image repository providing the second image.

In an embodiment, a user permission can be added to the second image, wherein the user permission allows a user indicated in the user permission to access the second image.

The descriptions above related to the process of method 600 or method 700 can be applied to system 800, and details are omitted herein for conciseness.

In addition, according to another embodiment of the present disclosure, a computer program product for feature processing is disclosed. As an example, the computer program product comprises a non-transitory computer readable storage medium having program instructions embodied therewith, and the program instructions are executable by a processor. When executed, the program instructions cause the processor to perform one or more of the above described procedures, and details are omitted herein for conciseness.

It should be noted that the processing of the method of image management for container runtimes or achieved by the system of image management for container runtimes as described hereinbefore according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures.

For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of image management for container runtimes, the computer-implemented method comprising:
   responsive to initializing an image manager, downloading, by one or more processing units, a first image of a first application for a first container runtime from an image repository providing the first image;
   extracting, by one or more processing units, content data of the first application and management data corresponding to the first application and the first container runtime from the first image, wherein the content data of the first application and the management data corresponding to the first application and the first container runtime are extracted to be processed differently so the content data of the first application can be shared across different container runtimes, wherein the management data corresponding to the first application and the first container runtime from the first image is different than management data corresponding to a second application and a second container runtime;
   storing, by one or more processing units, the content data of the first application, the management data corresponding to the first application, and the first container runtime in an image sharing file system in response to the content data of the first application being not stored in the image sharing file system;
   storing, by one or more processing units, only the management data corresponding to the first application and the first container runtime in the image sharing file system in response to the content data of the first application being stored in the image sharing file system;
   creating, by one or more processing units, a second image based on the content data of the second application stored in the image sharing file system and management data corresponding to the second application and the second container runtime in response to the content data of the second application being stored in the image sharing file system;
   generating, by one or more processing units, the management data corresponding to the second application and the second container runtime based on management data corresponding to the second application and a third container runtime stored in the image sharing file system, wherein the third container runtime is different from the second container runtime, and wherein the generating further comprises applying a set of predefined rules to transform the management data of the third container runtime into the management data of the second container runtime.

2. The computer-implemented method of claim 1, further comprising:
   receiving, by one or more processing units, an image pulling request for the second image of the second application for the second container runtime;
   checking, by one or more processing units, whether content data of the second application is stored in the image sharing file system; and
   downloading, by one or more processing units, the second image from an image repository providing the second image in response to the content data of the second application being not stored in the image sharing file system.

3. The computer-implemented method of claim 2, wherein the creating the second image in response to the content data of the second application being stored in the image sharing file system comprises:
   retrieving, by one or more processing units, the management data corresponding to the second application and the second container runtime from the image sharing file system.

4. The computer-implemented method of claim 2, wherein the checking whether content data of the second application is stored in the image sharing file system comprises:
   checking, by one or more processing units, whether there is content data of the second application stored in the image sharing file system based on image names of the images stored in the image sharing file system.

5. The computer-implemented method of claim 2, wherein the checking whether content data of the second application is stored in the image sharing file system further comprises:
   downloading, by one or more processing units, the management data corresponding to the second application and the second container runtime from the image repository providing the second image; and
   obtaining, by one or more processing units, a checksum for the content data of the second application from the management data corresponding to the second application and the second container runtime; and
   checking, by one or more processing units, whether there is content data of the second application stored in the image sharing file system based on the checksum.

6. The computer-implemented method of claim 5, wherein the creating the second image in response to the content data of the second application being stored in the image sharing file system comprises:
   creating, by one or more processing units, the second image based on the content data of the second application stored in the image sharing file system and the management data corresponding to the second application and the second container runtime downloaded from the image repository providing the second image.

7. The computer-implemented method of claim 2, wherein the creating the second image in response to the content data of the second application being stored in the image sharing file system comprises:
   adding, by one or more processing units, a user permission to the second image, wherein the user permission allows a user indicated in the user permission to access the second image.

8. The computer-implemented method of claim 1, wherein the storing the management data corresponding to the first application and the first container runtime is in a copy-on-write (CoW) manner such that the data subjected to copy-on-write operation can be read and written concurrently without locking the original data.

9. A system of image management for container runtimes, comprising:
   one or more processors;
   a memory coupled to at least one of the processors; and
   a set of computer program instructions stored in the memory, which, when executed by at least one of the processors, perform actions of:

responsive to initializing an image manager, downloading a first image of a first application for a first container runtime from an image repository providing the first image;

extracting content data of the first application and management data corresponding to the first application and the first container runtime from the first image, wherein the content data of the first application and the management data corresponding to the first application and the first container runtime are extracted to be processed differently so the content data of the first application can be shared across different container runtimes, wherein the management data corresponding to the first application and the first container runtime from the first image is different than management data corresponding to a second application and a second container runtime;

storing both the content data of the first application and the management data corresponding to the first application and the first container runtime in an image sharing file system in response to the content data of the first application being not stored in the image sharing file system;

storing only the management data corresponding to the first application and the first container runtime in the image sharing file system in response to the content data of the first application being stored in the image sharing file system;

creating, by one or more processing units, a second image based on the content data of the second application stored in the image sharing file system and management data corresponding to the second application and the second container runtime in response to the content data of the second application being stored in the image sharing file system;

generating, by one or more processing units, the management data corresponding to the second application and the second container runtime based on management data corresponding to the second application and a third container runtime stored in the image sharing file system, wherein the third container runtime is different from the second container runtime, and wherein the generating further comprises applying a set of predefined rules to transform the management data of the third container runtime into the management data of the second container runtime.

10. The system of claim 9, wherein the set of computer program instructions perform actions of:

receiving, by one or more processing units, an image pulling request for the second image of the second application for the second container runtime;

checking, by one or more processing units, whether content data of the second application is stored in the image sharing file system; and downloading, by one or more processing units, the second image from an image repository providing the second image in response to the content data of the second application being not stored in the image sharing file system.

11. The system of claim 10, wherein the creating the second image in response to the content data of the second application being stored in the image sharing file system comprises:

retrieving the management data corresponding to the second application and the second container runtime from the image sharing file system.

12. The system of claim 10, wherein the checking whether content data of the second application is stored in the image sharing file system comprises:

checking whether there is content data of the second application stored in the image sharing file system based on image names of the images stored in the image sharing file system.

13. The system of claim 10, wherein the checking whether content data of the second application is stored in the image sharing file system further comprises:

downloading the management data corresponding to the second application and the second container runtime from the image repository providing the second image; and obtaining a checksum for the content data of the second application from the management data corresponding to the second application and the second container runtime; and checking whether there is content data of the second application stored in the image sharing file system based on the checksum.

14. The system of claim 13, wherein the creating the second image in response to the content data of the second application being stored in the image sharing file system comprises:

creating the second image based on the content data of the second application stored in the image sharing file system and the management data corresponding to the second application and the second container runtime downloaded from the image repository providing the second image.

15. The system of claim 10, wherein the creating the second image in response to the content data of the second application being stored in the image sharing file system comprises:

adding a user permission to the second image, wherein the user permission allows a user indicated in the user permission to access the second image.

16. A computer program product of image management for container runtimes, the computer program product comprising a non-transitory computer readable storage medium having program instructions embodied therewith, the program instructions executable by a processor to cause the processor to:

responsive to initializing an image manager, downloading a first image of a first application for a first container runtime from an image repository providing the first image;

extracting content data of the first application and management data corresponding to the first application and the first container runtime from the first image, wherein the content data of the first application and the management data corresponding to the first application and the first container runtime are extracted to be processed differently so the content data of the first application can be shared across different container runtimes, wherein the management data corresponding to the first application and the first container runtime from the first image is different than management data corresponding to a second application and a second container runtime;

storing both the content data of the first application and the management data corresponding to the first application and the first container runtime in an image sharing file system in response to the content data of the first application being not stored in the image sharing file system;

storing only the management data corresponding to the first application and the first container runtime in the image sharing file system in response to the content data of the first application being stored in the image sharing file system;

creating, by one or more processing units, a second image based on the content data of the second application stored in the image sharing file system and management data corresponding to the second application and the second container runtime in response to the content data of the second application being stored in the image sharing file system;

generating, by one or more processing units, the management data corresponding to the second application and the second container runtime based on management data corresponding to the second application and a third container runtime stored in the image sharing file system, wherein the third container runtime is different from the second container runtime, and wherein the generating further comprises applying a set of pre-defined rules to transform the management data of the third container runtime into the management data of the second container runtime.

17. The computer program product of claim 16, wherein the program instructions executable by the processor to further cause the processor to:

receiving, by one or more processing units, an image pulling request for the second image of the second application for the second container runtime;

checking, by one or more processing units, whether content data of the second application is stored in the image sharing file system; and downloading, by one or more processing units, the second image from an image repository providing the second image in response to the content data of the second application being not stored in the image sharing file system.

18. The computer program product of claim 17, wherein the creating the second image in response to the content data of the second application being stored in the image sharing file system comprises:

retrieving the management data corresponding to the second application and the second container runtime from the image sharing file system.

19. The computer program product of claim 17, wherein the checking whether content data of the second application is stored in the image sharing file system comprises:

checking whether there is content data of the second application stored in the image sharing file system based on image names of the images stored in the image sharing file system.

20. The computer program product of claim 17, wherein the creating the second image in response to the content data of the second application being stored in the image sharing file system comprises:

adding a user permission to the second image, wherein the user permission allows a user indicated in the user permission to access the second image.

* * * * *